US009508246B2

(12) United States Patent
Okano et al.

(10) Patent No.: US 9,508,246 B2
(45) Date of Patent: Nov. 29, 2016

(54) IN-VEHICLE CHARGING DEVICE, AUTOMOBILE AND CHARGING SYSTEM

(71) Applicant: Panasonic Intellectual Property Management Co., Ltd., Osaka (JP)

(72) Inventors: Sohtaro Okano, Kanagawa (JP); Izumi Iwanaga, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 33 days.

(21) Appl. No.: 14/417,316

(22) PCT Filed: Jul. 25, 2013

(86) PCT No.: PCT/JP2013/004540
§ 371 (c)(1),
(2) Date: Jan. 26, 2015

(87) PCT Pub. No.: WO2014/017099
PCT Pub. Date: Jan. 30, 2014

(65) Prior Publication Data
US 2015/0248830 A1    Sep. 3, 2015

(30) Foreign Application Priority Data

Jul. 27, 2012  (JP) ................................. 2012-166770

(51) Int. Cl.
*G08B 29/00* (2006.01)
*G08B 21/24* (2006.01)
*H02J 17/00* (2006.01)
(Continued)

(52) U.S. Cl.
CPC ............. *G08B 21/24* (2013.01); *B60R 25/406* (2013.01); *H02J 7/0004* (2013.01); *H02J 17/00* (2013.01); *H04W 4/008* (2013.01); *H02J 7/025* (2013.01)

(58) Field of Classification Search
CPC ........ H02J 7/025; H02J 5/005; H02J 7/0044; H02J 17/00; H02J 7/0004; Y02T 90/122; H01F 38/14; B60L 11/187; H04B 5/0093; G08B 21/24; B06R 25/406; H04W 4/008
USPC ...................................... 320/108; 340/539.11
See application file for complete search history.

(56) References Cited

U.S. PATENT DOCUMENTS

2006/0290319 A1    12/2006   Burgan et al.
2011/0018498 A1*    1/2011   Soar ........................ B60N 2/44
                                                                  320/108

(Continued)

FOREIGN PATENT DOCUMENTS

CN    101208823    6/2008
JP    2007-104868    4/2007

(Continued)

OTHER PUBLICATIONS

International Search Report issued Aug. 20, 2013 in International Application No. PCT/JP2013/004540.

*Primary Examiner* — Tesfaldet Bocure
(74) *Attorney, Agent, or Firm* — Wenderoth, Lind & Ponack, L.L.P.

(57) ABSTRACT

During charging of a mobile device by a charging coil, a charge controller acquires information of the seating position of the owner of the mobile device, through a short-range wireless communicating section, and therefore issues an alarm when a person who causes the mobile device to be charged performs an operation of leaving from the seating position. Consequently, it is possible to prevent the mobile device from being left in a vehicle.

6 Claims, 7 Drawing Sheets

(51) Int. Cl.
*B60R 25/40* (2013.01)
*H02J 7/00* (2006.01)
*H04W 4/00* (2009.01)
*H02J 7/02* (2016.01)

(56) References Cited

U.S. PATENT DOCUMENTS

2011/0137773 A1 6/2011 Davis, III et al.
2013/0249482 A1* 9/2013 Iwanaga ............... H01M 10/46
  320/108
2013/0249682 A1* 9/2013 Van
  Wiemeersch ....... B60R 25/1004
  340/426.24
2015/0380975 A1* 12/2015 Kanahara ................ H02J 7/025
  320/108

FOREIGN PATENT DOCUMENTS

| | | |
|---|---|---|
| JP | 2009-296780 | 12/2009 |
| JP | 2010-28936 | 2/2010 |
| JP | 2011-36125 | 2/2011 |
| JP | 2012-70565 | 4/2012 |

* cited by examiner

IN-VEHICLE CHARGING DEVICE, AUTOMOBILE AND CHARGING SYSTEM

TECHNICAL FIELD

The present invention relates to an in-vehicle charging device which charges a mobile device such as a mobile telephone in a non-contact manner, an automobile, and a charging system.

BACKGROUND ART

An in-vehicle charging device includes a charging coil for charging a rechargeable battery of a mobile device such as a mobile telephone, and a charge controller which is connected to the charging coil, and performs non-contact charging of the rechargeable battery of the mobile device in a vehicle (for example, see Patent Literature 1).

CITATION LIST

Patent Literature

Patent Literature 1: JP-A-2011-36125

SUMMARY OF INVENTION

Technical Problem

In an automobile in which the above-described in-vehicle charging device is disposed, not only the driver, but also another person who is in the automobile can cause a mobile device to be charged. In addition to a mobile device of the driver of a taxi, for example, also that of a passenger in the taxi can be charged. In the case where the passenger is unaccustomed to cause the mobile device to be charged by using such an in-vehicle charging device, particularly, the passenger may forget that the own mobile device is being charged, and get off the taxi while leaving the mobile device in the taxi.

Moreover, persons including the driver who are not causing an own mobile device to be charged cannot know whose mobile device is being charged. Therefore, the persons cannot indicate that a mobile device is left in the taxi. As a result, the owner of the mobile device gets off the taxi while leaving the mobile device in the taxi.

It is an object of the invention to provide an in-vehicle charging device, automobile, and charging system which can prevent a mobile device from being left in a vehicle.

Solution to Problem

The invention provides an in-vehicle charging device which includes: a charging coil that charges a rechargeable battery of a mobile device; a charge controller that is connected to the charging coil; and a first short-range wireless communicating section that is connected to the charge controller, wherein, during charging of the rechargeable battery of the mobile device by the charging coil, the charge controller acquires information of a seating position of an owner of the mobile device, through the first short-range wireless communicating section, and outputs the seating position information from an external outputting section that is connected to the charge controller.

Advantageous Effects of Invention

The in-vehicle charging device of the invention includes: a charging coil that charges a rechargeable battery of a mobile device; a charge controller that is connected to the charging coil; and a first short-range wireless communicating section that is connected to the charge controller, and, during charging of the rechargeable battery of the mobile device by the charging coil, the charge controller acquires information of a seating position of an owner of the mobile device, through the first short-range wireless communicating section, and outputs the seating position information from an external outputting section that is connected to the charge controller. Therefore, it is possible to prevent the mobile device from being left in a vehicle.

During charging of a mobile device by the charging coil, namely, the charge controller acquires information of the seating position of the owner of the mobile device, through the first short-range wireless communicating section, and therefore can issue an alarm based on an operation of leaving from the seating position. As a result, it is possible to prevent the mobile device from being left in a vehicle.

DESCRIPTION OF EMBODIMENTS

Hereinafter, an embodiment of the invention will be described with reference to the accompanying drawings.

Figure 1:
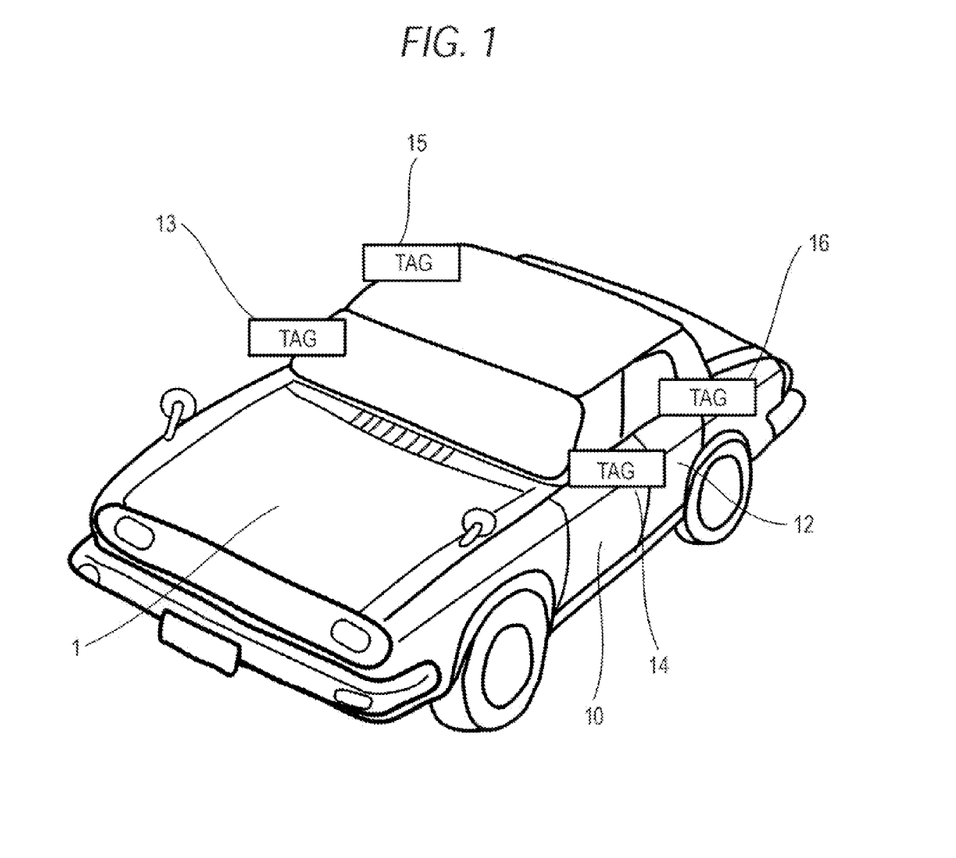
FIG. 1 is a perspective view showing an automobile in which an in-vehicle charging device of an embodiment is mounted.
Figure 2:
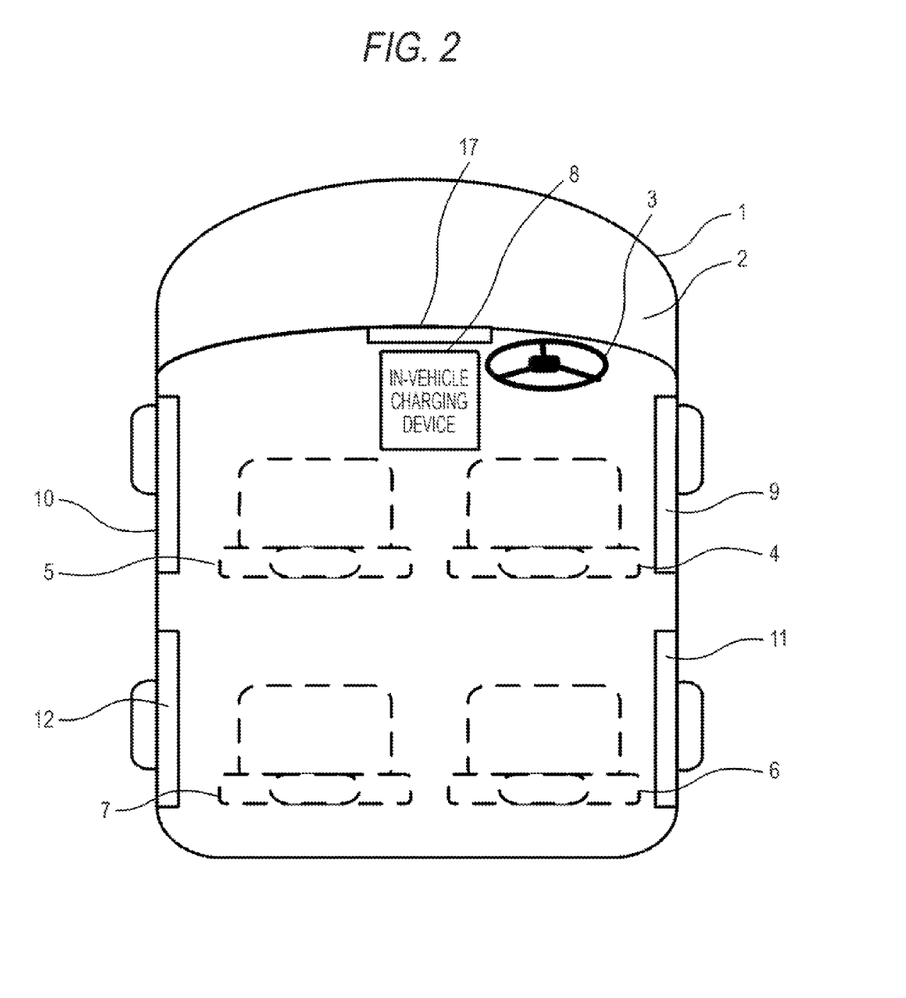
FIG. 2 is a top view showing the interior of the automobile shown in FIG. 1.

FIG. 1 is a perspective view showing an automobile in which an in-vehicle charging device of the embodiment is mounted. FIG. 2 is a top view showing the interior of the automobile shown in FIG. 1. In the automobile body 1, as shown in FIGS. 1 and 2, a steering wheel 3 is placed in the front side of the cabin 2. in the rear of the steering wheel 3 in the cabin 2, a driver seat 4, a front passenger seat 5, and rear passenger seats 6, 7 are disposed. In the fore-and-aft direction of the cabin 2, moreover, an in-vehicle charging device 8 is disposed between the steering wheel 3, and the driver seat 4 and the front passenger seat 5, and between the driver seat 4 and the front passenger seat 5.

Furthermore, a door 9 is disposed in the outer portion of the driver seat 4 in the automobile body 1, so that the driver is enabled to get in or out of the cabin 2 by opening the door 9. Similarly, a door 10 is disposed in the outer portion of the front passenger seat 5 in the automobile body 1, so that the passenger to sit on the front passenger seat 5 is enabled to get in or out of the cabin 2 by opening the door 10. Moreover, a door 11 is disposed in the outer portion of the rear passenger seat 6 in the automobile body 1, so that the passenger to sit on the rear passenger seat 6 is enabled to get in or out of the cabin 2 by opening the door 11. Similarly, a door 12 is disposed in the outer portion of the rear passenger seat 7 in the automobile body 1, so that the passenger to sit on the rear passenger seat 7 is enabled to get in or out of the cabin 2 by opening the door 12. As shown in FIG. 1, tags 13, 14, 15, 16 which serve as a seating position setting section are disposed in opening/closing knobs (not shown) of the outer surfaces of the doors 9 to 12.

Figure 3:
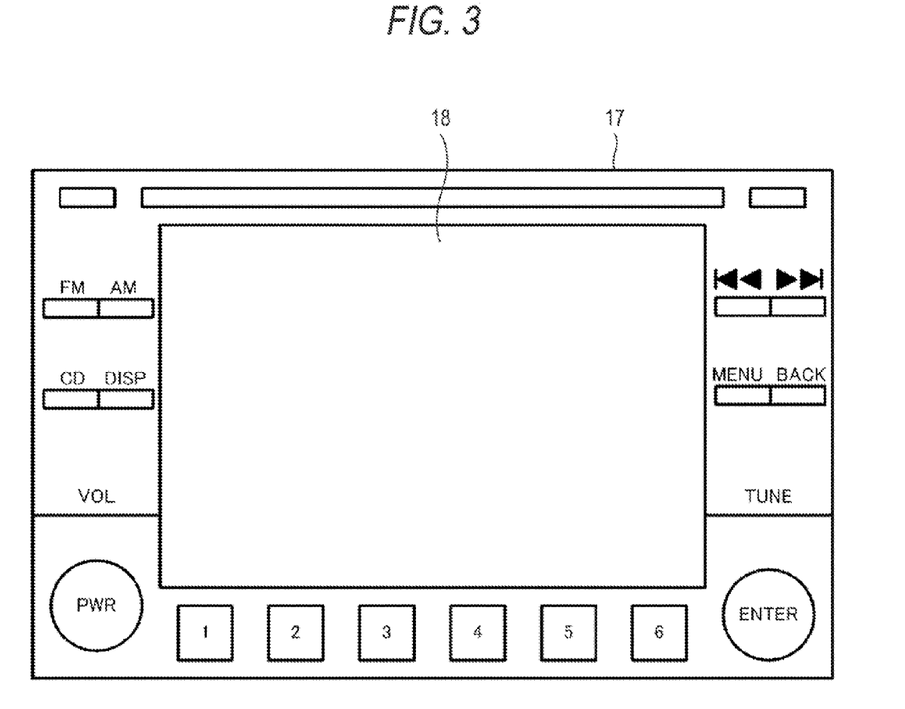
FIG. 3 is a front view of the in-vehicle charging device disposed in the automobile shown in FIG. 1.
Figure 4:
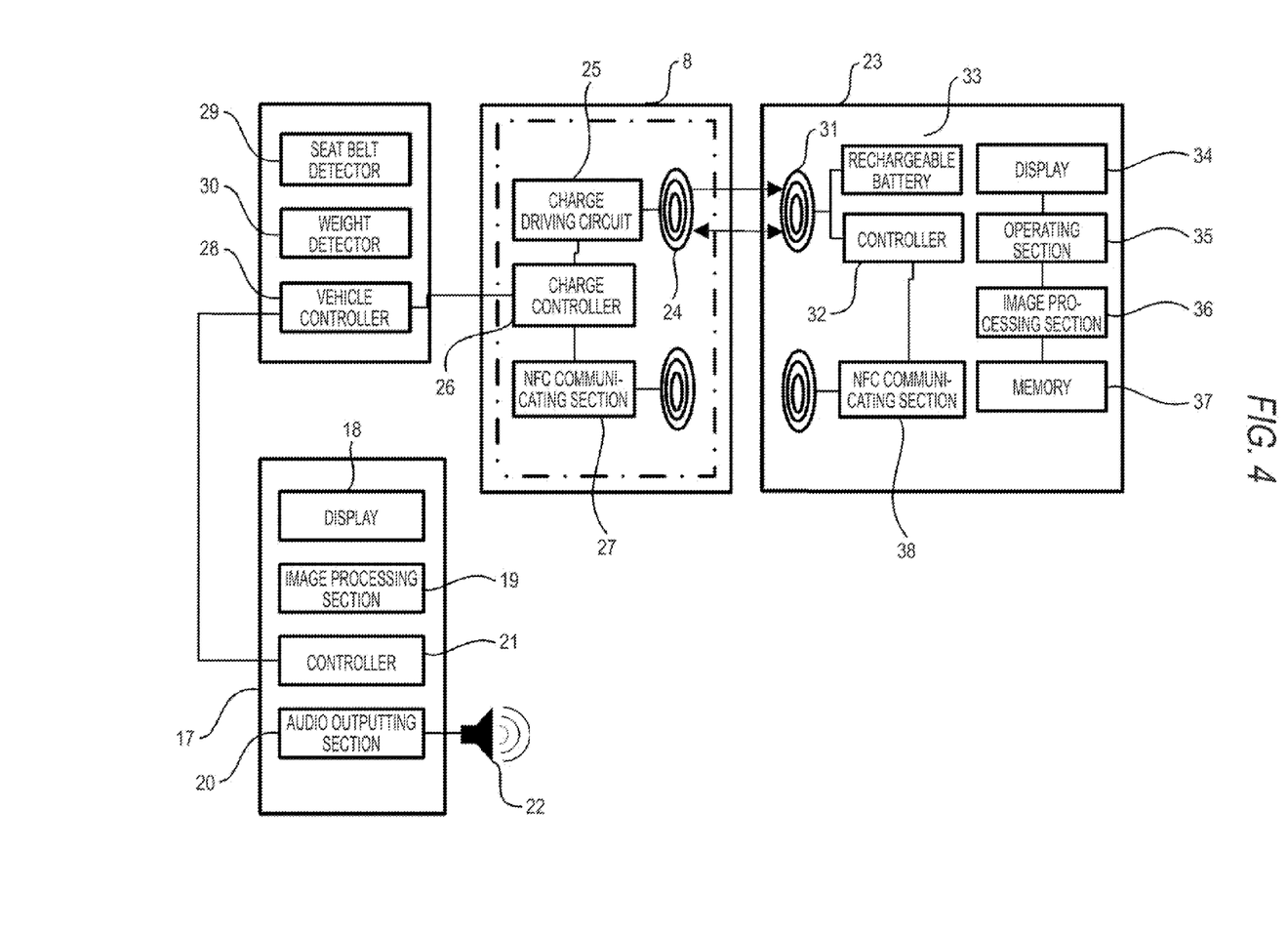
FIG. 4 is a block diagram of a charging system which is constructed in the automobile shown in FIG. 1.

As shown in FIG. 2, an in-vehicle electronic apparatus 17 for navigation and AV reproduction is disposed on a lateral side of the steering wheel 3 in the cabin 2. As shown in FIGS. 3 and 4, the in-vehicle electronic apparatus 17 has a display 18, an image processing section 19, an audio outputting section 20, and a controller 21 for them. A speaker 22 which serves also as an alarm outputting section is connected to the audio outputting section 20. FIG. 3 is a front view of the in-vehicle electronic apparatus 17. FIG. 4 is a block diagram of a charging system which is constructed in the automobile.

As shown in FIG. 4, the in-vehicle charging device 8 includes a charging coil 24, a charge driving circuit 25, a charge controller 26, and a short-range wireless communicating section (hereinafter, referred to as "NFC communicating section") 27. The charging coil 24 charges a rechargeable battery 33 of a mobile device 23 shown in FIG. 4. The charge controller 26 is connected to the charging coil 24 through the charge driving circuit 25. The NFC communicating section 27 is connected to the charge controller 26.

The charge controller 26 is connected also to a vehicle controller 28. The vehicle controller 28 is connected to the controller 21 of the in-vehicle electronic apparatus 17, and also to a seat belt detector 29 and weight detector 30 which are placed as a seating detector in each of the driver seat 4, the front passenger seat 5, and the rear passenger seats 6, 7.

As shown in FIG. 4, the mobile device 23 includes a charging coil 31, a controller 32 which is connected to the charging coil 31, the rechargeable battery 33, a display 34 which is connected to the controller 32, an operating section 35, an image processing section 36, a memory 37, and an NFC communicating section 38. The NFC communicating section 38 is connected to the controller 32.

Figure 5:
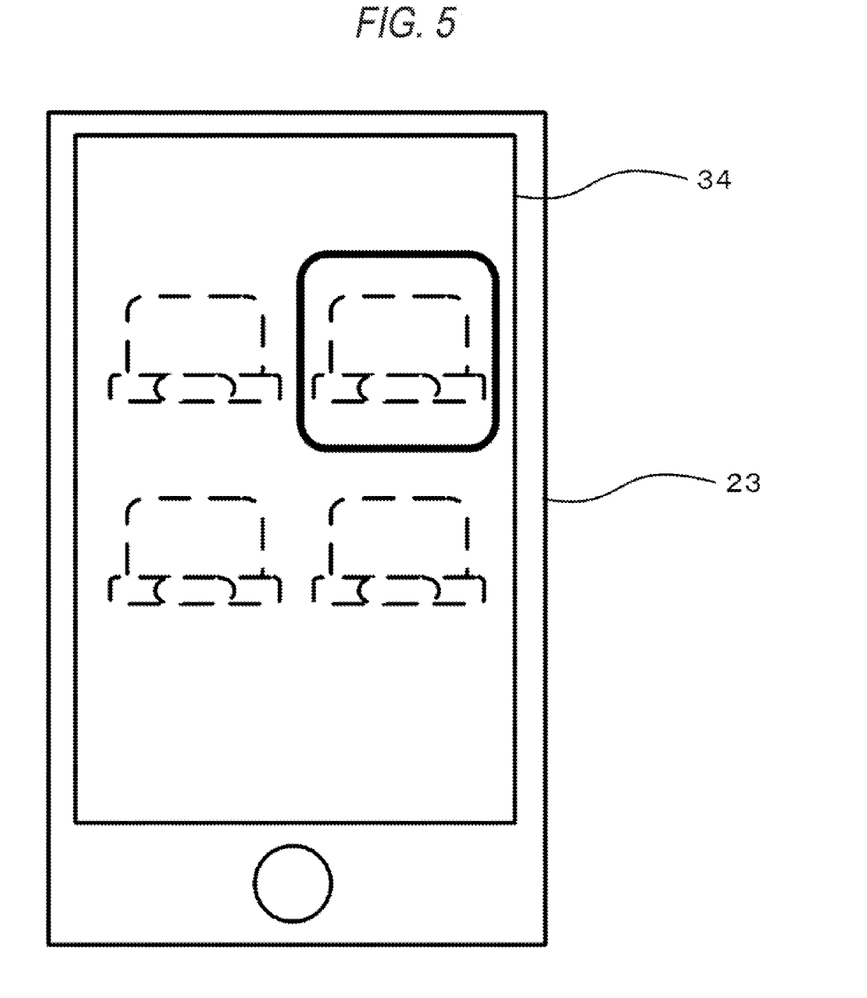
FIG. 5 is a front view of a mobile device in which a seating position of a passenger is displayed on a display.
Figure 6:
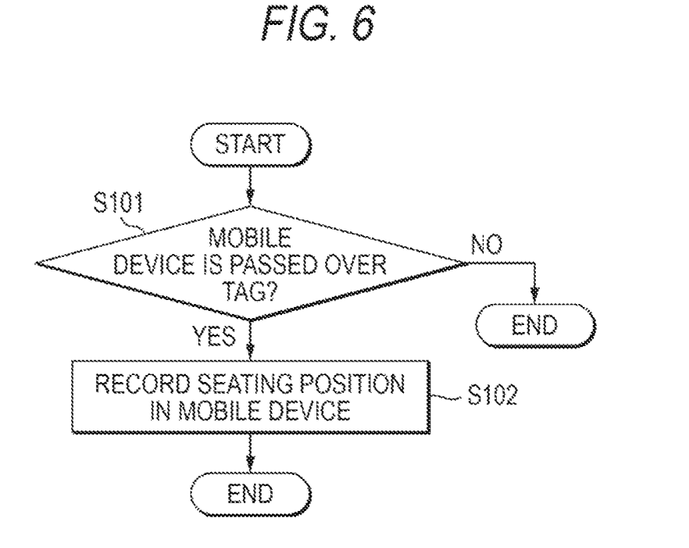
FIG. 6 is a flowchart showing the operation of the mobile device.

When a person who carries the mobile device 23 opens one of the doors 9 to 12 and gets in the cabin 2, the person passes the mobile device 23 over the tag (13 to 16) which is disposed as the seating position setting section in the opening/closing knob (not shown) of the outer surface of the opened door (S101 of FIG. 6). Namely, the person causes the mobile device 23 to approach the tag. Then, the seating position (the driver seat 4, the front passenger seat 5, the rear passenger seat 6, or the rear passenger seat 7) of the person is read through the NFC communicating section 38 of the mobile device 23 shown in FIG. 4, and recorded as seating position information in the memory 37 (S102 of FIG. 6). As shown in FIG. 5, moreover, the seating position of the person in the cabin 2 is displayed on the display 34 of the mobile device 23.

Hereinafter, a case where the person who has opened the door 12 shown in FIGS. 1 and 2 and sat on the rear passenger seat 7 attaches the mobile device 23 to the in-vehicle charging device 8 to cause the device to be charged will be described.

Figure 7:
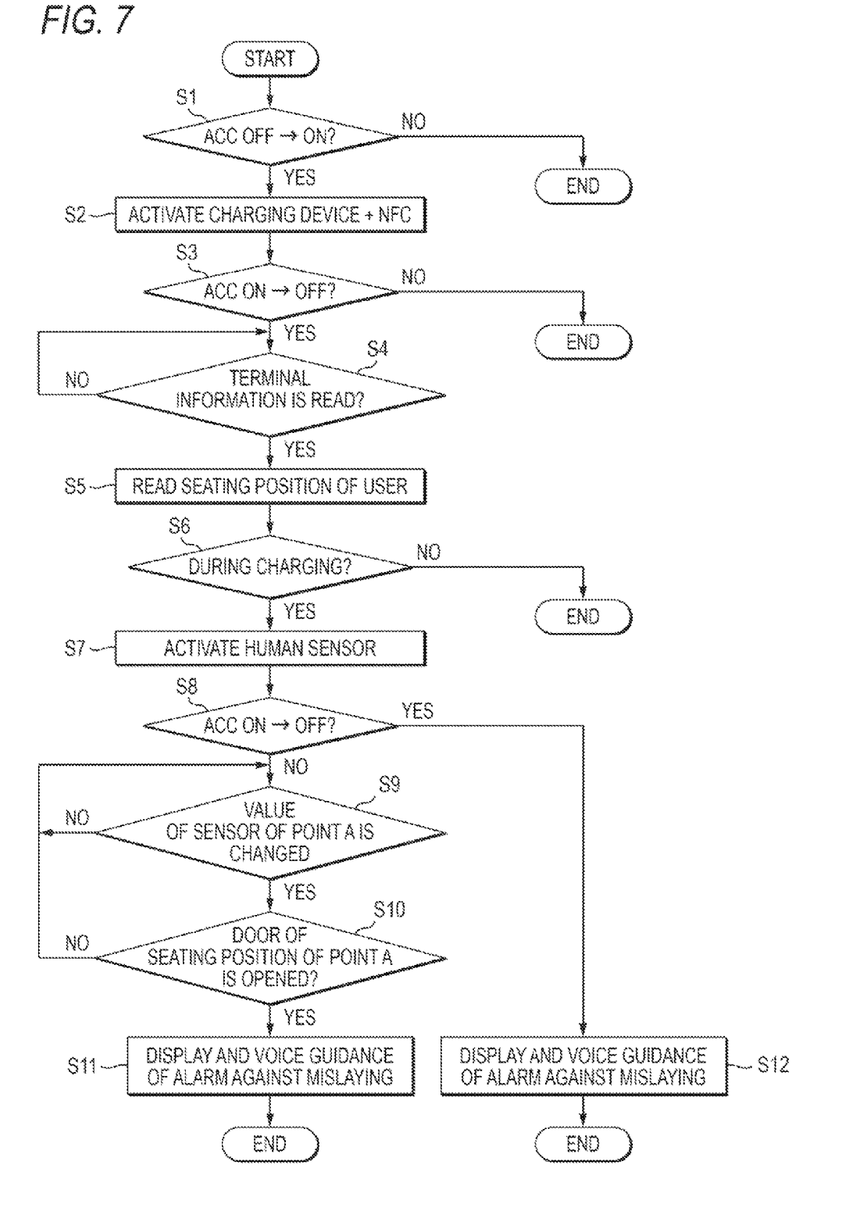
FIG. 7 is a flowchart showing the operation of the charging system which is constructed in the automobile.

The driver operates the ignition switch of the automobile to turn ON the ACC power supply (S1 of FIG. 7). Then, the in-vehicle charging device 8 is activated (S2 of FIG. 7), and the activated state is kept held unless a power supply switch (not shown) of the in-vehicle charging device 8 is turned OFF (S3 of FIG. 7). When the person who has sat on the rear passenger seat 7 attaches the mobile device 23 to the in-vehicle charging device 8, the charging coil 24 of the in-vehicle charging device 8, and the charging coil 31 of the mobile device 23 are opposed to each other as shown in FIG. 4. In this state, as described also in JP-A-2009-247194, for example, the impedance of the charging coil 24 of the in-vehicle charging device 8 is changed, and therefore the charge controller 26 recognizes that the mobile device 23 is attached.

In the state where the mobile device 23 is attached to the in-vehicle charging device 8, the NFC communicating section 27 of the in-vehicle charging device 8, and the NFC communicating section 38 of the mobile device 23 are approximated and opposed to each other. Therefore, the seating position information (in this case, information indicative of the rear passenger seat 7) recorded in the memory 37 of the mobile device 23 is transmitted to the charge controller 26 of the in-vehicle charging device 8, and then to the vehicle controller 28 (S4 and S5 of FIG. 7). In this state, the rechargeable battery 33 of the mobile device 23 is charged in a non-contact manner by the charging coil 24 of the in-vehicle charging device 8 (S6 of FIG. 7). Also the seat belt detector 29 and weight detector 30 which are used as the seating detector detect that a person is sitting on the rear passenger seat 7 (S7 of FIG. 7).

When the automobile reaches the place where the person who sits on the rear passenger seat 7 is to get off the automobile, the person first gets off the automobile. At this time, the power supply of the in-vehicle charging device 8 remains to be turned ON (S8 of FIG. 7). When the person who sits on the rear passenger seat 7 begins to prepare for getting off, the situation is captured from information output from the seat belt detector 29 and the weight detector 30 (S9 of FIG. 7). Then, the door 12 for the rear passenger seat 7 is opened (S10 of FIG. 7). At this time, if the mobile device 23 of the person who has sat on the rear passenger seat 7 remains to be attached to the in-vehicle charging device 8, the vehicle controller 28 controls the in-vehicle electronic apparatus 17 through the controller 21 so as to output an alarm from the speaker 22 (S11 of FIG. 7).

In this way, the situation where the mobile device 23 remains to be attached to the in-vehicle charging device 8 is notified not only to the person who has sat on the rear passenger seat 7, but also to the driver and a fellow passenger(s). As a result, it is possible to prevent the mobile device 23 from being left.

Also in the case where, in a stage before the person who is sitting on the rear passenger seat 7 gets off the vehicle in a situation such as that where the automobile stops for dining, the power supply of the in-vehicle charging device 8 is turned OFF, the vehicle controller 28 controls the in-vehicle electronic apparatus 17 through the controller 21 so as to output the alarm from the speaker 22 (S12 of FIG. 7).

The control of the output of the alarm from the speaker 22 may be performed by the charge controller 26 of the in-vehicle charging device 8 through the controller 21 of the in-vehicle electronic apparatus 17. In this case, however, the information output from the seat belt detector 29 and the weight detector 30 must be transmitted from the vehicle controller 28 to the charge controller 26.

Although the invention has been described in detail and with reference to the specific embodiment, it is obvious to a person skilled in the art that various changes and modifications can be made without departing from the spirit and scope of the invention.

The application is based on Japanese Patent Application (No. 2012-166770) filed on Jul. 27, 2012, and its disclosure is incorporated herein by reference.

INDUSTRIAL APPLICABILITY

In the in-vehicle charging device of the invention, during charging of a mobile device by the charging coil, the charge controller acquires the information of the seating position of the owner of the mobile device, through the NFC communicating section, and therefore can issue an alarm based on an operation of leaving from the seating position. As a result, it is possible to prevent the mobile device from being left in the vehicle.

Therefore, the invention is useful as an in-vehicle charging device or the like.

REFERENCE SIGNS LIST 1 automobile body
2 cabin
3 steering wheel
4 driver seat
5 front passenger seat
6, 7 rear passenger seat
8 in-vehicle charging device
9, 10, 11, 12 door
13, 14, 15, 16 tag
17 in-vehicle electronic apparatus
18 display
19 image processing section
20 audio outputting section
21 controller
22 speaker
23 mobile device
24 charging coil
25 charge driving circuit
26 charge controller
27 short-range wireless communicating section (NFC communicating section)
28 vehicle controller
29 seat belt detector
30 weight detector
31 charging coil
32 controller
33 rechargeable batten
34 display
35 operating section
36 image processing section
37 memory
38 short-range wireless communicating section (NFC communicating section)

The invention claimed is:

1. An in-vehicle charging device comprising:
a charging coil that charges a rechargeable battery of a mobile device;
a charge controller that is connected to the charging coil; and
a first short-range wireless communicating section that is connected to the charge controller,
wherein during charging of the rechargeable battery of the mobile device by the charging coil, the charge controller acquires information of a seating position of an owner of the mobile device through the first short-range wireless communicating section, and outputs an alarm when: (i) it is determined that a vehicle door associated with the seating position information of the owner of the mobile device is opened, (ii) the owner of the mobile device is not in the seat, and (iii) the mobile device is still engaged with the charging coil.

2. An automobile comprising:
an automobile body;
a vehicle controller on the automobile body;
a seating detector that is connected to the vehicle controller;
an alarm outputting section that is connected to the vehicle controller;
a charging coil that charges a rechargeable battery of a mobile device;
a charge controller that is connected to the charging coil; and
a first short-range wireless communicating section that is connected to the charge controller,
wherein during charging of the rechargeable battery of the mobile device by the charging coil, the charge controller acquires information of a seating position of an owner of the mobile device through the first short-range wireless communicating section, and outputs an alarm via the alarm outputting section when: (i) it is determined that a vehicle door associated with the seating position information of the owner of the mobile device is opened, (ii) the seating detector indicates that the owner of the mobile device is not in the seat, and (iii) the mobile device is still engaged with the charging coil.

3. The automobile according to claim 2, wherein the automobile body has a plurality of doors for the cabin, and a seating position setting section disposed in each of the doors.

4. The automobile according to claim 3, wherein the seating position setting section is disposed in a knob portion of each of the doors.

5. The automobile according to claim 4, wherein the seating position setting section comprises a tag.

6. A charging system comprising:
a mobile device having a rechargeable battery;
an automobile having an automobile body;
a vehicle controller on the automobile body;
a seating detector that is connected to the vehicle controller;
an alarm outputting section that is connected to the vehicle controller;
a charging coil that charges the rechargeable battery of the mobile device;
a charge controller that is connected to the charging coil; and
a first short-range wireless communicating section that is connected to the charge controller,
wherein during charging of the rechargeable battery of the mobile device by the charging coil, the charge controller acquires information of a seating position of an owner of the mobile device through the first short-range wireless communicating section, and outputs an alarm via the alarm outputting section when: (i) it is determined that a vehicle door associated with the seating position information of the owner of the mobile device is opened, and (ii) the seating detector indicates that the owner of the mobile device is not in the seat, while the mobile device is still engaged with the charging coil;
wherein the mobile device has a second short-range wireless communicating section that acquires the seating position information; and
wherein the mobile device transmits the seating position information to the vehicle controller through the second short-range wireless communicating section, the first short-range wireless communicating section, and the charge controller of the in-vehicle charging device.

* * * * *